INVENTOR.
DANIEL W. ROPER
BY
ATTORNEYS

United States Patent Office 3,517,573
Patented June 30, 1970

3,517,573
CENTRIFUGALLY ACTUATED LOCKING DIFFERENTIAL
Daniel W. Roper, Rochester, Mich., assignor to Eaton Yale & Towne Inc., Cleveland, Ohio, a corporation of Ohio
Filed May 8, 1968, Ser. No. 727,566
Int. Cl. F16d *41/16, 43/00;* F16h *1/44*
U.S. Cl. 74—711                 11 Claims

ABSTRACT OF THE DISCLOSURE

An improved drive mechanism includes a drive member, a driven member, and a clutch assembly which is operable by an actuator assembly to an engaged condition wherein relative rotation between the members is retarded by the clutch assembly. The actuator assembly operates the clutch assembly to the engaged condition when a centrifugal force which results from relative rotation between the members exceeds a predetermined function of another centrifugal force which results from rotation of one of the members.

---

The present invention relates generally to a drive mechanism, and more particularly to a limited slip differential having clutch means to drivingly connect the driving and driven members to retard relative rotation therebetween. In accordance with the present invention the clutch means is operated by an actuator responsive to centrifugal force which results from relative rotation between the driving and driven members.

A known limited slip differential includes driving and driven members which are drivingly interconnected by a clutch which is operated to an engaged condition by an actuator having a viscous coupling mechanism. In certain environments and with certain viscous coupling fluids, problems have been encountered with the viscous coupling mechanism of the actuator due to changes in viscosity of the fluid with changes in temperature. Another problem which has been encountered with known limited slip differentials is a loss of directional stability or swerving of the associated vehicle at high speeds when one of the wheels encounters a slippery condition and the clutch is suddenly actuated to directly drive the other wheel of the vehicle.

Accordingly, it is an object of this invention to provide a new and improved limited slip differential having driving and driven members, a clutch operable to an engaged condition interconnecting the members, and an actuator constructed in such a manner as to operate the clutch to the engaged condition in response to a centrifugal force which results from relative rotation between the members.

Another object of this invention is to provide a limited slip differential in accordance with the preceding paragraph wherein the actuator is also responsive to a centrifugal force resulting from rotation of at least one of the members and tending to retard operation of the actuator whereby the actuator operates the clutch to the engaged condition when the centrifugal force resulting from relative rotation between the members exceeds a predetermined function of the centrifugal force resulting from rotation of the members.

Another object of this invention is to provide a limited slip differential having an actuator which is responsive to both the rate of relative rotation between the driving and driven members and the rate of rotation of at least one of the members to drivingly interconnect the members when the speed of relative rotation between the members exceeds a predetermined function of the speed of rotation of one of the members.

These and other objects and features of the invention will become more apparent upon a consideration of the following description taken in connection with the accompanying drawings wherein.

Figure 1:
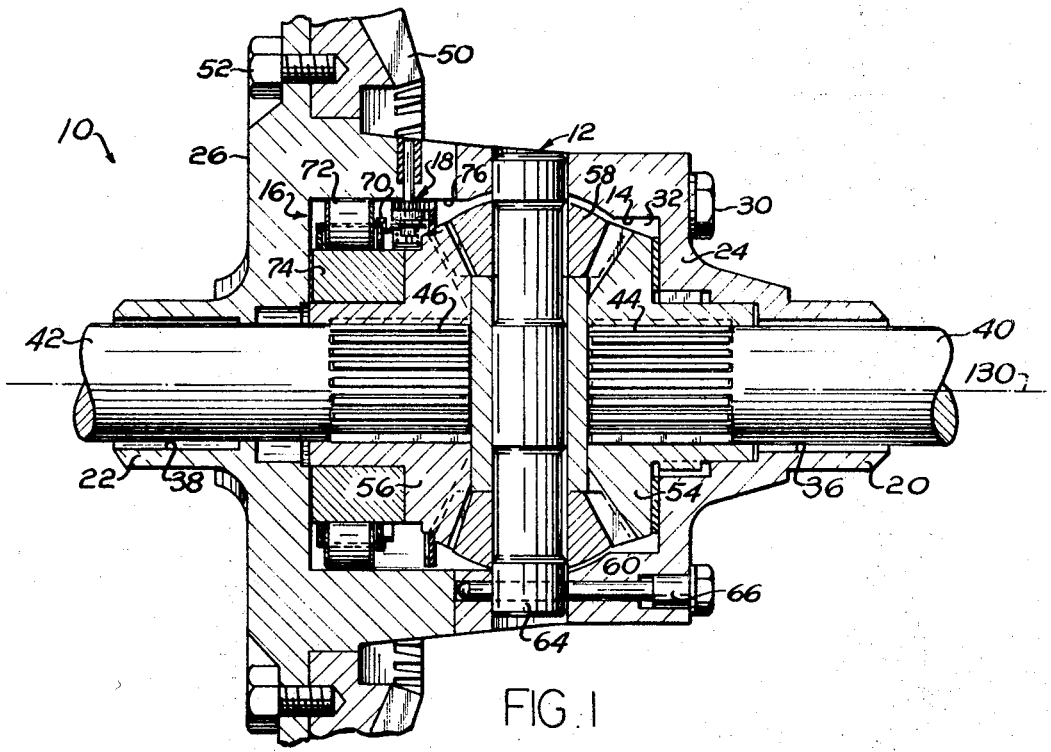
FIG. 1 is a sectional view of a differential mechanism embodying the present invention.

The present invention provides an improved drive mechanism including a clutch assembly for drivingly connecting driving and driven members and an actuator which is operated in response to a centrifugal force resulting from relative rotation between the members. Operation of the clutch assembly drivingly connects the driving and driven members to retard relative rotation between the driving and driven members. The actuator assembly is also responsive to another centrifugal force which tends to retard operation of the actuator assembly and results from rotation of one of the mmebers. At high speeds, this other centrifugal force is relatively large and prevents operation of the actuator assembly and clutch assembly during high speed rotation of a driven member. While the drive mechanism is applicable to different environments, it is particularly adapted for use in a vehicle as a differential. Accordingly, as representative of a preferred embodiment of the present invention the drawings illustrate a differential drive mechanism or assembly 10.

The differential drive assembly 10 is especially suitable for use in driving ground or surface engaging traction wheels of a vehicle. The differential drive assembly 10 includes a rotatable planet gear carrier or casing 12, a differential gear train 14, a clutch assembly 16 operable in an engaged condition to retard rotation of one of the gears of the gear train 14 relative to the planet gear carrier 12, and an actuator assembly 18 for operating the clutch assembly 16 from a disengaged condition to an engaged condition.

The planet gear carrier 12 includes a pair of support portions 20 and 22 adapted to be received in bearings of a supporting structure, such as an axle housing, not shown, by which the carrier 12 is rotatably supported. The carrier 12 further includes a pair of members 24, 26 which are integrally formed with the support portions 20, 22, respectively, and are secured together by screws 30 (only one of which is illustrated). The members 24, 26 define a gear chamber 32 in which the gear train 14 and clutch assembly 16 are located. The support portions 20, 22 are provided with axial openings 36, 38 which communicate with the chamber 32 and receive or accommodate driven or power output means as represented by axle shafts 40, 42, respectively, whose outer end portions are connected with traction wheels, or the like, not shown, and whose inner, or adjacent end portions are connected with the gear train 14 by splines 44, 46 which are formed on the end of the shafts 40, 42.

The differential drive assembly 10 includes a ring gear 50 extending around and mounted on the carrier 12 by means of connecting screws 52 which extend through a flange portion of the planet carrier 12. A suitable drive pinion, not show, meshes with the ring gear 50 and represents the power input means for the differential drive assembly or mechanism 10 and upon rotation effects rotation of the ring gear 50 to rotate the planet carrier 12.

The gear train 14 is operable to transmit the rotary motion of the planet carrier 12 to the output shafts 40, 42. The gear train 14 comprises a pair of bevel side gears 54.

56 and a group of bevel pinion planetary gears 58, 60 disposed between and meshed in engagement with the side gears 54, 56 for drivingly connecting the latter. The planetary gears 58, 60 are rotatably supported by the carrier 14 by means of a pinion shift 64 extending across the gear chamber 32 and secured to the carrier 12 by an anchor pin 66.

The side gears 54, 56 and pinion gears 58, 60 are, in the preferred embodiment, all bevel gears of conventional form as far as the teeth thereof are concerned, and the tooth profiles are of a conventional shape having pressure angle values coming within the usual range of such values. The side gears 54, 56 are provided with splines which mesh with splines 44, 46 on the shafts 40, 42 to drivingly connect the side gears 54, 56 to the shafts 40, 42, respectively.

The clutch assembly 16 is a double overrunning clutch operable to retard relative rotation between the side gear 56 and the planet carrier 12. More specifically, the clutch assembly 16 is mounted for rotation with the side gear 56 and is oeprable to an engaged condition to drivingly lock or interconnect the planet carrier 12 and the side gear. The clutch assembly 16 is positioned between the planet carrier 12 and the side gear 56 and includes a shiftable roller cage or frame 70, and a plurality of rollers 72, supported in openings in the shiftable roller cage 70. The openings are dimensioned so as to permit the rollers 72 to be freely rotatable and radially shiftable relative to the cage 70 and, yet, prevent circumferential movement of the rollers relative thereto.

The roller cage 70 is shiftable or movable to a position wherein the rollers 72 are wedgingly engaged between surfaces formed on an annular member 74 and a cylindrical surface 76 forming the inner periphery of the carrier 12. The annular member 74 is drivingly connected to the side gear 56 so that the wedging of the rollers drivingly connects the carrier 12 and the side gear 56 together. This operation of the clutch assembly locks up the differential gear assembly 10 in a manner which is described in detail in copending application Ser. No. 637,112, now Pat. No. 3,448,636, entitled "Differential Mechanism" and filed by Roper et al. on May 9, 1967 and assigned to the same assignee as is the present invention. Of course, clutch assemblies other than the specific illustrated embodiment could be used in the differential assembly 10.

The clutch assembly 16 is associated with the actuator assembly or means 18 (see FIG. 2) for moving the rollers 72 to their engaged positions between the surface on the member 74 and the surface 76 of the carrier 12 in response to a centrifugal force which results from relative rotation between the carrier 12 and side gear 56. While it is contemplated that many different types of centrifugally responsive actuators could be used to operate the clutch assembly 16 to an engaged condition, the illustrated embodiment of the actuator 18 includes an actuator drive 82 for rotating flyweights or elements 86 at a speed which is proportional to the speed of relative rotation between the sides gears 56 and the carrier 12. This rotation of the flyweights 86 subjects them to a centrifugal force which causes them to move outwardly to operate the actuator 18 to the condition shown in FIG. 3 wherein a reaction plate 88 engages a flange portion 92 of a friction ring 94 which is secured to the roller cage 70. The engagement between the friction ring 94 and the reaction plate 88, the engaging surfaces constituting a secondary clutch, shifts the roller cage relative to the annular member 74 upon relative rotation between the side gear 56 and carrier 12. This shifting of the roller cage 70 operates the clutch assembly 16 to the engaged condition wherein the rollers 72 drivingly connect the carrier 12 and side gear 56 to retard relative rotation therebetween.

As was previously mentioned, the actuator drive 82 rotates the flyweights 86 at a speed which is proportional to the speed of relative rotation between the carrier 12 and side gear 56. To this end, the actuator drive 82 includes a ring gear 100 which is fixedly mounted on the side gear 56 and meshes with a pinion gear 102 fixedly connected to a rotatable support shaft 104 mounted on the carrier 12. When relative rotation occurs between the carrier 12 and the side gear 56, relative movement between the ring gear 100 and pinion gear 102 rotates the support shaft 104 at a speed which is proportional to the speed of relative rotation between the side gear 56 and the carrier 12. Rotation of the shaft 104 rotates the flyweights 86 and subjects the flyweights to a centrifugal force which causes them to move radially outwardly relative to the shaft 104. Of course, the centrifugal force urging the flyweights 86 outwardly is $F_c = MrW^2$ proportional to the speed of rotation of the shaft 104 and, therefore, the speed of relative rotation between the side gear 56 and carrier 12.

Figure 2:
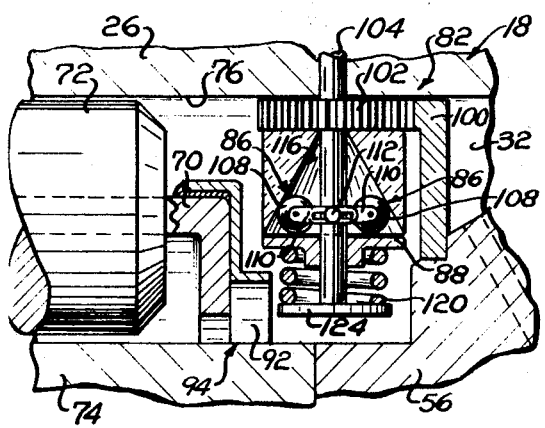
FIG. 2 is a fragmentary sectional view, on an enlarged scale, of an actuator for operating a clutch assembly of the differential mechanism of FIG. 1 to an engaged condition in response to a centrifugal force.
Figure 3:
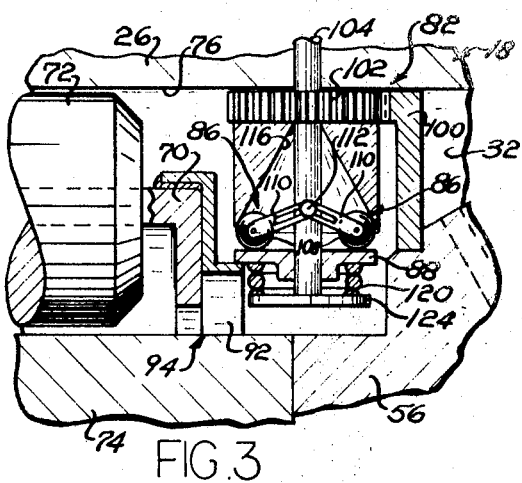
FIG. 3 is a fragmentary sectional view, on an enlarged scale, illustrating the actuator assembly of FIG. 2 in an operated condition for moving the clutch assembly to an engaged condition.

To operate the clutch assembly 16, the reaction plate 88 is moved from the normal position of FIG. 2 to the operated position of FIG. 3 to engage the friction ring 94. Subsequent relative rotation between the carrier 12 and side gear 56 moves the reaction plate 88 and roller cage 70 to operate the clutch 16 and to thereby drivingly connect the carrier 12 and side gear 56. To provide this movement of the reaction plate 88 upon relative rotation between the carrier 12 and side gear 56, the flyweights 86 include balls 108 which are connected to the shaft 104 by brackets 110 having slots for receiving a pin 112 fixedly connected to the shaft. A generally cone shaped cam means 116 is fixedly connected to the pinion gear 102 and the shaft 104 for forcing the flyweight balls 108 downwardly as they move outwardly under the influence of the centrifugal force resulting from rotation of the shaft 104. Thus, during rotation of the shaft 104 the flyweights 86 move outwardly and downwardly (as viewed in FIGS. 2 and 3) under the combined influence of centrifugal force resulting from the rotation of the shaft and the action of the cam 116. This movement of the flyweights 86 is resisted by a spring 120 which is mounted between the reaction plate 88 and circular base 124 which is fixedly connected to the shaft 104.

In view of the preceding description, it can be seen that the actuator 18 includes a drive assembly 82 which subjects the flyweights 86 to a centrifugal force which results from and is proportional to the rate of relative rotation between the side gear 56 and carrier 12. When the centrifugal force on the flyweights 86 is sufficient to overcome the influence of the spring 120, the actuator 18 is operated to move the actuator plate 88 into engagement with the friction ring 94 mounted on the roller cage 70 of the clutch assembly 16. Subsequent relative rotation between the carrier 12 and side gear 56 results in the roller cage 70 of the clutch assembly being shifted to operate the clutch assembly to an engaged condition to thereby retard relative rotation between the carrier 12 and side gear 56. Of course, other types of actuators responsive to centrifugal force resulting from relative rotation between the carrier 12 and side gear 56 could be used for operating a clutch other than the illustrated clutch assembly 16.

In addition to being responsive to the centrifugal force which results from relative rotation between the carrier 12 and side gear 56, the actuator 18 is also responsive to a centrifugal force resulting from and proportional to a speed of rotation of the carrier 12 to retard operation of the actuator. This centrifugal force resulting from rotation of the carrier 12 prevents the actuator 18 from operating the clutch assembly 16 to an engaged condition during high speed operation of the vehicle. Thus, the actuator 18 is operated from the normal condition of FIG. 2 to the operated condition of FIG. 3, when the centrifugal force resulting from relative rotation between the side gear 56 and the carrier 12 exceeds a predetermined function of the centrifugal force resulting from rotation of the carrier 12. These offsetting centrifugal forces result from rotation of the flyweights 86 about two different axes. The rotation about one axis subjects the flyweights 86 to a centrifugal force tending to move them outwardly and downwardly (from the position shown in FIG. 2 to the position shown in FIG. 3) under the influence of the cam 116 to thereby operate the actuator 18 to engage the clutch assembly 16. The rotation about the other axis subjects the flyweights to a centrifugal force tending to move them inwardly and upwardly (from the position shown in FIG. 3 to the position shown in FIG. 2) under the influence of the cam 116 to thereby prevent operation of the actuator 18.

During operation of the differential assembly 10, the carrier 12 is rotated about a longitudinal axis 130 of the axle shafts 40 and 42 by rotation of the ring gear 50. Since the flyweights 86 are mounted for rotation with the carrier 12, this rotation of the carrier 12 about the longitudinal axis 130 subjects the flyweights 86 to a centrifugal force tending to urge them outwardly from the axis 130, or in an upward direction as viewed in FIG. 2. Since the flyweights 86 are moved toward the longitudinal axis 130 or downwardly from the position shown in FIG. 2 to the position shown in FIG. 3 to operate the actuator 18, the centrifugal force resulting from rotation of the carrier 12 about the axis 130 tends to retard operation of the actuator 18. Of course, the speed of rotation of the carrier 12 about the axis 130 is proportional to the speed of operation of the vehicle. Therefore, during high speed vehicle operation the carrier 12 is rotated at a relatively high speed and the flyweights are subjected to a relatively large centrifugal force preventing operation of the actuator 18 to engage the clutch assembly 16.

When the centrifugal force resulting from the speed of relative rotation between the side gear 56 and carrier 12 exceeds a predetermined function of the centrifugal force resulting from the rotation of the carrier 12, the actuator 18 is operated to engage the clutch assembly 16. This is because when the centrifugal force resulting from the spinning of the flyweights 86 about the central axis of the shaft 104 exceeds, by a predetermined function, the centrifugal force resulting from the rotation of the flyweights about the axis 130, the flyweights 86 are moved downwardly or toward the axis 130, in the manner previously explained, to press the reaction plate 88 into engagement with the friction ring 94 and thereby operate the clutch assembly 16 to the engaged condition. Since the speed of rotation of the carrier 12 and actuator 18 about the axis 130 is directly proportional to the speed of operation of the vehicle with which the differential assembly 10 is associated, the centrifugal force tending to retard operation of the actuator 18 is directly proportional to the speed of operation of the vehicle. Accordingly, during high speed the operation of the vehicle and high speed rotation of the carrier 12, the centrifugal force on the flyweights 86 due to rotation of the axis 130 is sufficient to prevent the actuator 18 from operating the clutch assembly 16 to the engaged condition. Therefore, during high speed operation of the vehicle the actuator 18 is effectively disabled from operating the clutch assembly 16. This prevents the clutch assembly 16 from being moved to an engaged condition when one wheel of the vehicle engages an icy or slippery patch and relative rotation occurs between the driving wheels of the vehicle.

In view of the foregoing remarks it can be seen that I have provided an actuator 18 which is responsive to both the rate of relative rotation between the side gear 56 and carrier 12 and to the rate of rotation of the carrier 12 for operating the clutch assembly 16 to an engaged condition when the speed of relative rotation between the side gear 56 and carrier 12 exceeds a predetermined function of the speed of rotation of the carrier 12. These operating characteristics of the actuator 18 are obtained by an offsetting or counterbalancing of the first centrifugal force, which is proportional to the rate of relative rotation between the side gear 56 and carrier 12, and a second centrifugal force, which is proportional to the rate of rotation of the carrier. When the centrifugal force resulting from the rotation of the flyweights 86 relative to the carrier 12 exceeds a predetermined function of the centrifugal force resulting from the rotation of the carrier, the actuator assembly 18 is operated to operate the clutch assembly 16 and thereby retard relative rotation between the carrier 12 and side gear 56. However, it is contemplated that in certain installations it may be desirable to construct the actuator in such a manner as to operate the clutch assembly in response to only one centrifugal force.

What is claimed is:

1. A drive mechanism including a driving member and a driven member, first clutch means located between said members and operable between a first condition wherein said members are capable of rotating relative to each other and a second condition operatively interconnecting members to retard relative rotation between said members, actuator means having an operative condition for effecting operation of said first clutch means to said second condition and an inoperative condition, second clutch means operable from a first condition in which said actuator means is operatively disconnected from said first clutch means to a second condition wherein said actuator means is operatively connected with said first clutch means in response to operation of said actuator means from said inoperative condition to said operative condition to thereby enable said actuator means to effect operation of said first clutch means to its second condition, said actuator means being urged to said operative condition in response to relative rotation between said members, said actuator means being urged to said inoperative condition in response to rotation of said members whereby said first clutch means is operated to its second condition by said actuator means when the effect of the speed of relative rotation between said members is sufficient to overcome the effect of the speed of rotation of said members to operate said actuator means to the operative condition to thereby effect operation of said second clutch means to its second condition operatively interconnecting said actuator means and said first clutch means.

2. A drive mechanism as set forth in claim 1 wherein said actuator means includes an element mounted for rotation with one of said driving and driven members and movable relative to said one of said driving and driven members to effect operation of said actuator means to said operative condition to thereby operate said second clutch means to its second condition, and drive means drivingly connecting the other of said driving and driven members with said element to rotate said element relative to said one of said members upon relative rotation between said members to thereby subject said element to a first centrifugal force acting in a direction to effect operation of said actuator means to said operative condition, said element being subjected to a second centrifugal force acting in a direction to retard operation of said actuator means to said operative condition by rotation of said one member whereby said actuator means operates said second clutch means to its second condition when said first centrifugal force exceeds a predetermined function of said second centrifugal force.

3. A drive mechanism as set forth in claim 2 wherein said drive means includes a first gear mounted for rotation with the other of said members and a second gear connected to said element of said actuator means and engaging said first gear to thereby rotate said element relative to said one member upon relative rotation between said members.

4. A drive mechanism as set forth in claim 1 wherein said first clutch means has a relatively large force transmitting capacity to enable it to effectively retard relative movement between said members upon operation of said first clutch means to its second condition, said second clutch means having a relatively small force transmitting capacity which is sufficient to operatively interconnect said first clutch means and said actuator means upon operation of said actuator means to said operative condition to thereby enable said actuator means to effect operation of said first clutch means to its second condition under the influence of forces transmitted through said second clutch means.

5. A drive mechanism as set forth in claim 4 wherein said first clutch means includes a plurality of rollers mounted on a carrier, said second clutch means being operative to interconnect said carrier and said actuator means upon operation of said second clutch means to said operative condition to thereby operate said first clutch means to its second condition by wedgingly engaging said rollers between said members.

6. A drive mechanism as set forth in claim 1 wherein said second clutch means includes first friction surface means connected to said first clutch means and second friction surface means operatively connected with said actuator means, said first and second friction surface means being spaced apart when said second clutch means is in its first condition to thereby operatively disconnect said actuator means and said first clutch means, said first and second friction surface means being in engagement with each other when said second clutch means is in its second condition to thereby operatively interconnect said actuator means and said first clutch means and to enable said actuator means to effect operation of said first clutch means to its second condition in response to relative rotation between said actuator means and said first clutch means.

7. A differential gear assembly for transmitting drive forces from a source of power to a pair of members, said differential gear assembly comprising differential gearing for enabling one of said members to rotate relative to the other, main clutch means operable from a first condition in which said members are capable of rotating relative to each other and another condition wherein relative rotation between said members is retarded by said main clutch means, a rotatable element operatively associated with said main clutch means and said members and movable in an outward direction from one axis of rotation to operate said main clutch means to said second condition, biasing means for urging said rotatable element inwardly toward said one axis of rotation, and drive means for rotating said element relative to said members and said differential gearing about said one axis of rotation at a speed which is a function of the speed of relative rotation between said members to thereby subject said element to a first centrifugal force urging said element outwardly against the influence of said biasing means to operate said main clutch means to said second condition, said element being rotatable about another axis of rotation by rotation of said members to subject said element to a second centrifugal force offsetting said first centrifugal force resulting from the rotation of said element by said drive means whereby said element moves outwardly to operate said main clutch to said second condition only when said first centrifugal force resulting from rotation of said element by said drive means is greater than a predetermined function of said second centrifugal force resulting from rotation of said members.

8. A differential assembly as set forth in claim 7 wherein said main clutch means includes a plurality of rollers mounted in a cage which is rotatable with one of said members relative to the other of said members when said main clutch means is in said first condition, said element being movable outwardly to operate said main clutch means to said second condition by effecting relative movement between said cage and said one member.

9. A differential gear assembly as set forth in claim 7 wherein said drive means includes a first gear mounted in a fixed relationship with a gear of said differential gearing and a second gear mounted for rotation relative to said differential gearing with said element.

10. A differential gear assembly as set forth in claim 7 further including cam means for operatively cooperating with said biasing means to force said element inwardly toward said one axis of rotation.

11. A differential gear assembly as set forth in claim 7 further including secondary clutch means for operatively interconnecting said element and said main clutch means upon movement of said element outwardly under the influence of said first centrifugal force.

References Cited

UNITED STATES PATENTS

| 1,009,675 | 11/1911 | Lord | 74—336.5 X |
| 1,783,931 | 12/1930 | Tenney et al. | 74—336.5 |
| 1,838,380 | 12/1931 | Fraser | 74—711 |
| 2,102,314 | 12/1937 | Fraser | 74—711 X |
| 2,334,221 | 11/1943 | Schmidt | 74—711 |
| 2,482,460 | 9/1949 | Browne. | |
| 3,324,744 | 6/1967 | Roper | 74—711 |

FOREIGN PATENTS 607,356    8/1948    Great Britain.

DONLEY J. STOCKING, Primary Examiner

T. C. PERRY, Assistant Examiner

U.S. Cl. X.R.

192—35, 44, 103